Figure 1:
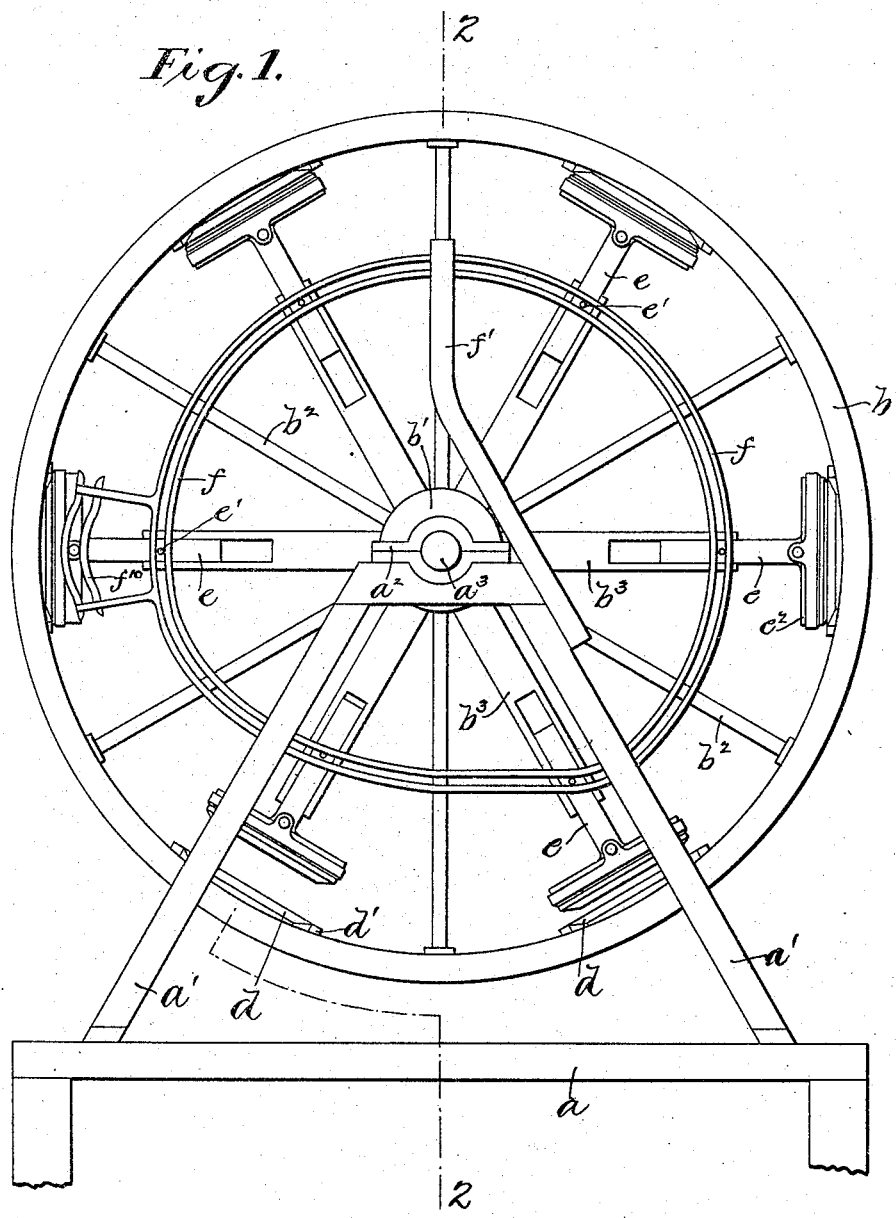

No. 782,615. PATENTED FEB. 14, 1905.
H. L. MANNING.
CRUST MOLDING MECHANISM FOR PIE MAKING MACHINES.
APPLICATION FILED NOV. 2, 1904.

2 SHEETS—SHEET 1.

WITNESSES:
W. W. Canby.
G. Beringer.

INVENTOR
Hugh L. Manning.
BY
Henry E. Everding.
ATTORNEY.

No. 782,615. PATENTED FEB. 14, 1905.
H. L. MANNING.
CRUST MOLDING MECHANISM FOR PIE MAKING MACHINES.
APPLICATION FILED NOV. 2, 1904.
2 SHEETS—SHEET 2.
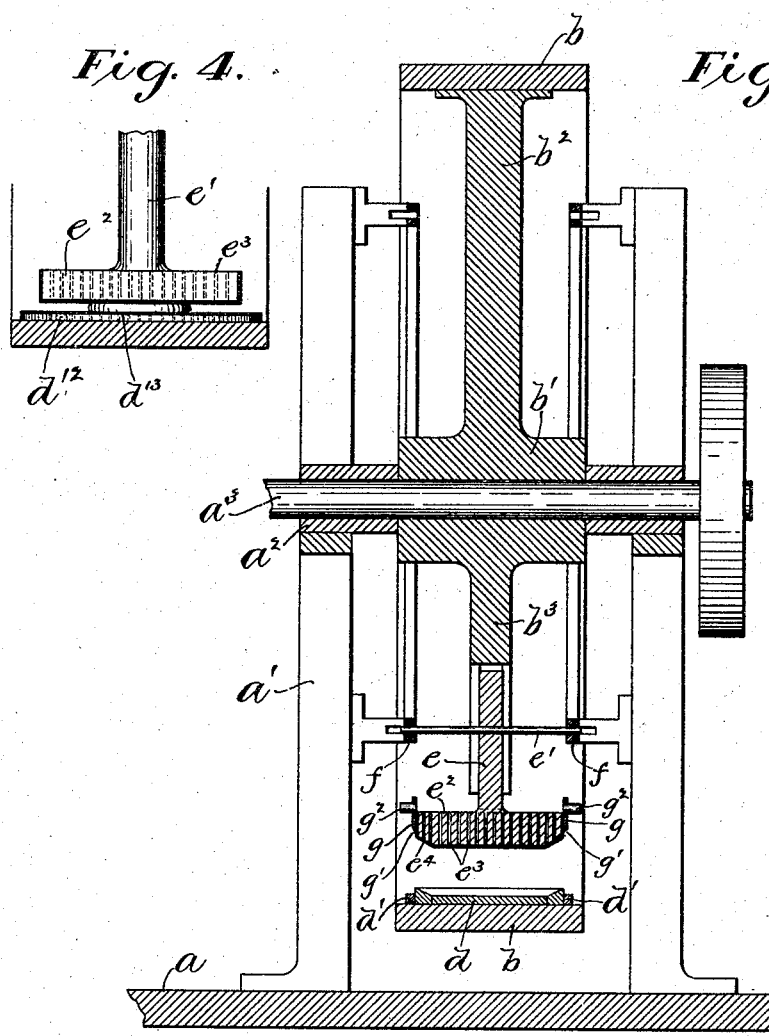
WITNESSES:
H. W. Canby.
G. Beringer.
INVENTOR
Hugh L. Manning,
BY
Henry E. Everding,
ATTORNEY.

No. 782,615. Patented February 14, 1905.

UNITED STATES PATENT OFFICE.

HUGH L. MANNING, OF PHILADELPHIA, PENNSYLVANIA.

CRUST-MOLDING MECHANISM FOR PIE-MAKING MACHINES.

SPECIFICATION forming part of Letters Patent No. 782,615, dated February 14, 1905.

Application filed November 2, 1904. Serial No. 231,054.

*To all whom it may concern:*

Be it known that I, HUGH L. MANNING, a citizen of the United States, residing at Philadelphia, in the county of Philadelphia and State of Pennsylvania, have invented certain new and useful Improvements in Crust-Molding Mechanism for Pie-Making Machines, of which the following is a specification.

My invention has relation to a mechanism for molding pie-dough into crusts preparatory to the completion of the pie by machinery or by hand, and in such connection it relates to the construction and arrangement of the parts constituting such a molding mechanism.

Heretofore it has been proposed to form from a lump of pie-dough a pie-crust by molding or pressing the same in a die by means of an appropriately-shaped plunger; but great difficulty has been experienced in manipulating plunger and die so that the dough would not cling to the plunger as it leaves the die and so that during the molding operation air would not enter between the plunger and dough, to thereby destroy the smoothness of the crust.

The principal object of my present invention is to so construct and arrange the molding mechanism that during and after the molding operation the dough does not cling to the molding-plunger and air does not remain between the plunger and dough when the plunger is pressing the dough into shape.

The nature and scope of my invention will be more fully understood from the following description, taken in connection with the accompanying drawings, forming part hereof, in which—

Figure 1 is a side elevational view of a preferred form of machine embodying main features of my invention. Fig. 2 is a cross-sectional view taken on the line 2 2 of Fig. 1. Fig. 3 is an underneath plan view, enlarged, of the plunger; and Fig. 4 is a detail view illustrating a plunger and die for forming top crusts for the pies.

Referring to the drawings, $a$ represents the bed of the machine, and $a'$ the angular uprights or supports for the bearings $a^2$ of a shaft $a^3$. The shaft $a^3$ is adapted to be rotated at required speed in any well-known manner, and carries a wheel $b$, on the interior periphery of which is arranged a series of dies $d$ to receive the dough and to assist in the formation of the crusts. From the hub $b'$ on the shaft $a^3$ radiates a series of spokes $b^2$, which extend to the perimeter of the wheel $b$, and intermediate of these spokes $b^2$ are arranged a series of radiating-arms $b^3$, which at their free ends are slotted to receive the stems $e$ of a series of plungers, each arranged to slide in the slot of an arm $b^3$ toward or away from a die $d$ in series. This sliding movement of the stems $e$ is secured preferably as follows: Within the wheel $b$ are located the cam-tracks $f$, between the rails of which extend the pins $e'$, each secured, respectively, to a stem $e$. The cam-tracks $f$ are preferably used in duplicate in the machine, and each track is supported by an upright or brace $f'$, extending upwardly from the angular supports $a'$. The cam-tracks or cams $f$ are so arranged that the plungers are successively advanced into the dies $d$ as the stems $e$ are raised by the rotation of the wheel $b$ and are successively retracted from the dies $d$ as the stems $e$ descend during said rotation.

The construction of the plunger-head forms an important feature of the present invention and is preferably as follows: The stem $e$ terminates in a head $e^2$, of wood, metal, or other rigid material, and this head $e^2$ is honeycombed or perforated, as indicated at $e^3$, Figs. 2 and 3, the perforations extending entirely through said head $e^2$. The exterior of the honeycombed head $e^2$ is covered with a porous material $e^4$, by preference silk. On the exterior of the head $e^2$ is arranged a ring $g$, preferably of metal, and having its lower portion beveled into a knife-edge $g'$. On the sides of the ring $g$ is secured one or more pins $g^2$, adapted at a certain period in the revolution of the plunger to enter an auxiliary cam-track $f^{10}$ and to be thrown outward by said track $f^{10}$ to cause the knife-edge of the ring to project below the molding-face of the plunger-head $e^2$. In Fig. 4 the shape of the plunger-head $e^2$ is flat and is especially adapted to mold flat top crusts for the pie. In this form the die $d^{12}$ is flat and is perforated and covered with a porous material $d^{13}$. In Figs. 1 to 3 the head $e^2$ of the plunger is shaped to fit the interior of a pie-plate, and the die $d$ is of a shape similar to that of a pie-plate with a metallic ring $d'$ surrounding its periphery to coact with the knife-edge of ring $g$ when the molded crust is to be cut off around the periphery of the die $d$.

The operation of the machine is as follows: The shaft $a^3$ is rotated at required speed and the wheel $b$, carrying the dies $d$ and the plunger-heads $e^2$, rotates with the shaft. As the wheel $b$ rotates the stems $e$ of the plunger-heads $e^2$ are moved in and out by the cam-tracks $f$. In the lowermost position of a plunger-head $e^2$ the track or cam $f$ retracts the head $e^2$ sufficiently away from a corresponding die $d$ to permit of the introduction of a lump of pie-dough, and as the wheel rotates—say from left to right—the head $e^2$ is farther and farther advanced in its die $d$ to compress and mold the lump into a shape required to form the pie-crust desired. When the plunger-head $e^2$ reaches a position in which the pins $g^3$ of its ring $g$ enters the auxiliary cam $f^{10}$, the ring $g$ is advanced on the head to sever the crust which extends beyond the die $d$. As the head $e^2$ further rotates, the ring $g$ is retracted on the head and the head retracted from its die to permit of the removal of the formed crust prior to the introduction of another lump of dough and a repetition of the operation.

The head $e^2$, by reason of its honeycombed character and by reason of its porous covering $e^4$, permits of the exit of air through the head during the molding operation and the entrance of air when the head is withdrawn from the crust in the die. This permits of a smooth molding of the dough, as well as a withdrawal of the plunger-head, without disturbing the crust in the die.

Having thus described the nature and object of my invention, what I claim as new, and desire to secure by Letters Patent, is—

1. In a device of the character described, a die and a coacting plunger, said plunger having a head provided with a series of perforations, each extending entirely through the head, substantially as described.

2. In a device of the character described, a die and a coacting plunger, said plunger having a head provided with a series of perforations each extending entirely through the head and a covering of porous material, substantially as described.

3. In a device of the character described, a die arranged to receive the dough and a coacting plunger adapted to mold the dough in said die, a ring surrounding the head of said plunger and adapted to be advanced thereon and a ring surrounding the die and coacting with the ring on the head to sever the dough outside the perimeter of the die.

4. In a device of the character described, a die arranged to receive the dough, and a coacting plunger adapted to mold the dough in said die, said plunger having a head provided with a series of perforations each extending entirely through the head and a stem carrying said head, combined with means for advancing and retracting the stem to cause the head to enter or leave said die.

5. In a device of the character described, a wheel, a series of dies carried on the internal periphery of said wheel, a series of plungers radiating from the hub of the wheel and each coacting with a die in series, each plunger having a head provided with a series of perforations each of which perforations extending through the head, and a cam located within the wheel and adapted to control the movement of each plunger toward or away from its die.

In testimony whereof I have signed my name in the presence of two subscribing witnesses.

HUGH L. MANNING.

Witnesses:
 JOSEPH L. MANNING,
 GUSTAV BERINGER.